United States Patent
Massie

[15] 3,679,740
[45] July 25, 1972

[54] PREPARATION OF AROMATIC ACIDS

[72] Inventor: Stephen N. Massie, Palatine, Ill.

[73] Assignee: Universal Oil Products Company, Des Plaines, Ill.

[22] Filed: Dec. 17, 1969

[21] Appl. No.: 886,038

[52] U.S. Cl. .................................260/524 R, 252/428
[51] Int. Cl. ...........................................C07c 63/02
[58] Field of Search ...............................260/524 R

[56] References Cited

UNITED STATES PATENTS

| | | | |
|---|---|---|---|
| 2,959,613 | 11/1960 | Whitfield | 260/524 |
| 2,552,267 | 5/1951 | Emerson et al. | 260/524 |

FOREIGN PATENTS OR APPLICATIONS

| | | | |
|---|---|---|---|
| 596,839 | 4/1960 | Canada | 260/524 |

OTHER PUBLICATIONS

Fieser et al, " Organic Chemistry," 3rd ed., 1956, p. 167.

Primary Examiner—Lorraine A. Weinberger
Assistant Examiner—R. Weissberg
Attorney—James R. Hoatson, Jr. and Raymond H. Nelson

[57] ABSTRACT

Aromatic acids such as benzoic acid are prepared by treating an alkylaromatic compound such as toluene with an oxygen-containing gas in the presence of a metal-containing compound at an elevated temperature in the range of from about 150° to about 250° C. The yields of the desired acids are improved by effecting the process in the presence of a compound containing nitrogen in the form of ammonia, amines, or compounds which will generate ammonia or amines under the reaction conditions.

9 Claims, No Drawings

PREPARATION OF AROMATIC ACIDS

This invention relates to a process for preparing aromatic acids and particularly to a process for obtaining improved yields of the desired aromatic acid by effecting the process in the presence of certain compositions of matter.

Aromatic acids are important compounds in the chemical industry today. For example, benzoic acid is used as a mordant in calico printing, seasoning tobacco and improving the aroma thereof, in flavors, perfumes, dentifrices, in medicine as a germicide, food packaging, textiles, dyes and as a plasticizer and resin intermediate. Likewise, the isomeric phthalic acids are important chemical compounds, orthophthalic acid (also known as phthalic acid) being used in dyes such as the synthesis of indigo, the manufacture of phthaleins, various fluorescein and eosin dyes, rhodamines and pyronine dyes; in medicine and synthetic perfumes. The anhydride of this acid is used in the preparation of alkyl resins, plasticizers, polyesters, as an intermediate in the preparation of pharmaceuticals and insecticides, etc. Isophthalic acid is also used as a component in polyester and polyurethane resins. Para-phthalic acid which is known as terephthalic acid is an important intermediate in the production of synthetic resins, fibers and films by combination of glycols, a particularly important fiber being the various nylons. Other polycarboxylic aromatic acids which may be prepared according to the process of this invention will include trimesic acid or pyromellitic acid, etc. These acids and the anhydride thereof such as pyromellitic dianhydride being useful as plasticizers in the preparation of water-based resins, epoxy molding compounds, etc.

It is therefore an object of this invention to provide a process for preparing aromatic acids.

A further object of this invention is to provide a process for obtaining improved yields of aromatic acids when utilizing an alkylaromatic compound as the starting material by effecting said process in the presence of certain compositions of matter hereinafter set forth in greater detail.

In one aspect an embodiment of this invention resides in a process for the preparation of an aromatic acid which comprises treating an alkylaromatic hydrocarbon with an oxygen-containing gas in the presence of a metal-containing compound and ammonia, amines or compounds which will generate ammonia or amines at oxidation conditions, and recovering the resultant aromatic acid.

A specific embodiment of this invention is found in the process for the preparation of an aromatic acid which comprises treating toluene with air in the presence of cobalt bromide and benzonitrile at a temperature in the range of from about 100° to about 250°C. and a pressure in the range of from about atmospheric to about 100 atmospheres, and recovering the resultant benzoic acid.

Other objects and embodiments will be found in the following further detailed description of the present invention.

It has now been unexpectedly discovered that the yields of desired oxidation products resulting from the treatment of alkylaromatic hydrocarbons with an oxygen-containing gas in the presence of certain catalytic compositions of matter may be greatly enhanced if the reaction is also effected in the presence of ammonia, amines or certain compounds containing nitrogen which are capable of being converted to ammonia or amines under the reaction conditions of the present invention. Examples of alkylaromatic compounds and particularly aromatic hydrocarbons which are treated with the aforementioned oxygen-containing gas will include both mono and poly alkyl-substituted aromatics. Of the aromatic compounds containing the alkyl substituents benzene comprises the preferred aromatic nucleus, although it is also contemplated within the scope of this invention that polynuclear aromatic hydrocarbons containing alkyl substituents such as the mono and poly alkylated naphthalenes, anthracenes, phenanthrenes, chrysenes, pyrenes, etc. may also be used, although not necessarily with equivalent results. Specific examples of mono and poly alkyl-substituted aromatic compounds will include toluene, ethylbenzene, n-propylbenzene, isopropylbenzene (cumene), o-xylene, m-xylene, p-xylene, 1,3,5-trimethylbenzene (mesitylene), 1,2,4,5-tetramethylbenzene (pseudocumene), 1,2,3-trimethylbenzene (hemimellitene), 1,2,4,5-tetramethylbenzene (durene), 1,2,3,5-tetramethylbenzene (isodurene), 1,2,3,4-tetramethylbenzene pentamethylbenzene, hexamethylbenzene, etc. It is to be understood that the aforementioned alkyl-substituted aromatic hydrocarbons are only representative of the class of compounds which may be oxidized to the corresponding aromatic acids and that the present invention is not necessarily limited thereto.

Examples of catalytic compositions of matter which may be utilized to effect the process of this invention will include metal salts and particularly those metals of Groups IIB, IIIB, IVB, VB, VIB, VIIB and VIII of the Periodic Table. Of these compounds the preferred salts will be those of the metals including cobalt, manganese, nickel and iron due to the fact that these salts are more readily available and consequently will have a correspondingly lower cost. Both soluble and insoluble metal salts may be used, said salts including, but not limited to, cobalt chloride, cobalt bromide, cobalt oxide, cobalt acetate, cobalt benzoate, cobalt naphthenate, cobalt octoate, cobalt neodecanoate, cobalt nitrate, cobalt sulphate, manganese chloride, manganese bromide, manganese oxide, manganese acetate, manganese benzoate, manganese naphthenate, manganese octoate, manganese neodecanoate, manganese nitrate, manganese sulphate, nickel chloride, nickel bromide, nickel oxide, nickel acetate, nickel benzoate, nickel naphthenate, nickel octoate, nickel neodecanoate, nickel nitrate, nickel sulphate, iron chloride, iron bromide, iron oxide, iron acetate, iron benzoate, iron naphthenate, iron octoate, iron neodecanoate, iron nitrate, iron sulphate. It is to be understood that the aforementioned metal salts are only representative of the class of compounds which may act as catalysts for the present process, and therefore, the present invention is not necessarily limited thereto.

Examples of compounds containing nitrogen which satisfy the specifications of this invention will include ammonia, methylamine, ethylamine, dimethylamine, triethylamine, benzonitrile, succinonitrile, acetonitrile, propionitrile, butyrylnitrile, valerylnitrile, capronitrile, caprylnitrile, caprinitrile, hydrogen cyanide, etc. As will be hereinafter shown in greater detail, the addition of a nitrogen-containing compound will result in an unexpected increase in the yield of a desired oxidation product, namely, an aromatic acid when the corresponding alkylaromatic hydrocarbon has been treated with an oxygen-containing gas in the presence of a catalyst of the type hereinbefore set forth in greater detail.

The reaction conditions under which the alkylaromatic compound is treated with an oxygen-containing gas such as air or oxygen, and preferably air due to the readily greater availability, in the presence of certain compositions of matter will include elevated temperatures ranging from about 100° up to about 250°C. or more. In addition, pressures ranging from atmospheric up to about 100 atmospheres or more may be utilized. Normally speaking, the superatmospheric pressures are provided for by the presence of the oxygen-containing gas in the reaction vessel. However, it is also contemplated within the scope of this invention that the oxygen-containing gas may provide only a partial pressure, the remainder of the desired operating pressure being provided for by the introduction of a substantially inert gas such as nitrogen into the reaction zone. In one embodiment of this invention the reaction is effected in the presence of an organic solvent such as methanol or a low molecular weight organic acid such as acetic acid or propionic acid. Higher molecular weight alcohols or acids are not preferred inasmuch as these latter compounds are more susceptible to oxidation and, therefore, will tend to form unwanted side products thus necessitating a more complex separation and purification system when recovering the desired aromatic acid. The amount of alkylaromatic hydrocarbon which is to be treated with the oxygen-containing gas will be found in excess over that of said oxygen-containing gas, usually being in a range of from about 2:1 to about 5:1 moles of alkylaromatic hydrocarbon per mole of oxygen. In addition, the amount of nitrogen-containing compound will be present in an amount ranging from about 3:1 to about 10:1 moles of metal-containing catalyst per mole of nitrogen-containing compound.

The process of this invention may be effected in any suitable manner and may comprise either a batch or continuous type operation. For example, when a batch type operation is used a quantity of the desired alkylaromatic hydrocarbon is placed in an appropriate apparatus such as, for example, a rotating autoclave, said autoclave containing the metal-containing catalyst and the nitrogen-containing compound which includes ammonia, amines or compounds in which the nitrogen is present in a double or triple bond state or which is capable of being converted to ammonia or an amine, and if so desired, a solvent of the type hereinbefore set forth, although the latter is not an absolute requirement for the process of this invention. The autoclave is sealed and the oxygen-containing gas is pressed into the reactor until the desired operating pressure has been reached. Following this the autoclave and contents thereof are then heated to the desired operating temperature and maintained for a predetermined period of time which may range from about 0.5 up to about 20 hours or more in duration. Upon completion of the desired residence time, heating is discontinued and the apparatus allowed to return to room temperature. Any excess pressure which may still be present is discharged, the autoclave is opened and the reaction product is recovered. The reaction mixture is separated from the catalyst, if in solid form, by conventional means such as filtration, extracted with alkali and thereafter recovered by acidification and extraction. It is also contemplated that the reaction may be effected in a batch type manner by utilizing a catalyst salt which is soluble in the solvent employed. For example, cobalt acetate may be used as the catalytic composition of matter when utilizing acetic acid as the solvent. The apparatus to be employed may then comprise a flask in which the alkylaromatic hydrocarbon, the cobalt acetate, the nitrogen-containing compound such as benzonitrile and the acetic acid are heated to reflux and the reaction then allowed to proceed at atmospheric pressure.

The process of this invention may also be effected in a continuous manner of operation. When this type of operation is used the alkylaromatic hydrocarbon is continuously charged to a reactor which is maintained at the proper operating conditions of temperature and pressure, said reactor containing the catalyst and the nitrogen-containing compound. In addition, the oxygen-containing gas is also continuously charged to the reactor through a separate line. While this demonstrates one particular mode of operation, it is to be understood that variations thereof may be employed to effect the reaction, said variations including the use of a solvent which may be charged to the reactor through a separate line or in admixture with the alkylaromatic hydrocarbon. In addition, it is also to be understood that various modifications of the continuous manner of operation may be employed depending upon the physical state of the catalyst composition. For example, if the catalyst is in solid form a fixed bed type of operation may be employed in which the catalyst is disposed as the fixed bed in the reactor and the alkylaromatic hydrocarbon passes through said bed of catalyst in either an upward or downward flow while being contacted with the oxygen-containing gas. Another type of continuous operation which may be employed is the moving bed type in which the catalyst and the reactant comprising the alkylaromatic hydrocarbon are passed through the reaction zone either concurrently or countercurrently to each other. Yet another type of operation which may be employed when the catalyst is in solid form and is not soluble in the solvent, if one is to be employed, comprises the slurry technique in which the catalyst is carried into the reactor as a slurry in the alkylaromatic hydrocarbon. After a predetermined resident time has elapsed the reactor effluent is continuously withdrawn from the reactor and subjected to conventional means of separation whereby the unreacted alkylaromatic hydrocarbon is recycled to the reaction zone to form a portion of the feed stock while the desired aromatic acid, after separation from the nitrogen-containing compound and catalyst, is removed to storage.

Some specific examples of aromatic acids which may be obtained when utilizing the process of this invention will include benzoic acid which may be prepared from toluene, ethylbenzene, propylbenzene, etc.; phthalic acid which may be obtained as the anhydride or may be subsequently dehydrated to form the corresponding phthalic anhydride; isophthalic acid; terephthalic acid; trimesic acid; trimellitic acid and its corresponding trimellitic anhydride; 1,2,3-tricarboxylic benzene; 1,2,4,5-tetracarboxylic benzene and its corresponding pyromellitic dianhydride; 1,2,3,5-tetracarboxylic benzene; 1,2,3,4-tetracarboxylic benzene; etc. It is to be understood that these acids are only representative of the class of aromatic acids which may be prepared, and that the present invention is not necessarily limited thereto.

The following examples are given to illustrate the process of the present invention which, however, are not intended to limit the generally broad scope of the present invention in strict accordance therewith.

EXAMPLE I

As the first experiment 63 g. of toluene was placed in the glass liner of a rotating autoclave. The autoclave was sealed and air pressed in until an initial pressure of 35 atmospheres was reached. The autoclave was then heated to a temperature of 180°C. and maintained at this temperature for a period of 16 hours, the maximum pressure at this temperature rising to 60 atmospheres. At the end of this time heating was discontinued and the autoclave allowed to return to room temperature, the final pressure at room temperature being 32 atmospheres. The excess pressure was discharged, the autoclave was opened and the reaction product mixture comprising 59 g. was recovered. The product was extracted with alkali and the benzoic acid was recovered by acidification and extraction. There was recovered 3.2 g. (26 mmoles) of benzoic acid as determined by a Gas-Liquid Chromatographic Analysis.

The above experiment was repeated using 4 g. of a cobalt bromide catalyst in addition to 57 g. of toluene in the autoclave. As in the preceding paragraph air was pressed in until an initial pressure of 35 atmospheres was reached. The autoclave was then heated to a temperature of 180°C. for a period of 16 hours during which time the maximum pressure rose to 58 atmospheres. At the end of the 16 hour residence time heating was discontinued and the autoclave allowed to return to room temperature, the final pressure at room temperature being 27 atmospheres. This excess pressure was then discharged and the reaction product mixture was treated in a manner similar to that hereinbefore set forth. There was recovered 11 g. (90 mmoles) of benzoic acid as determined by a Gas-Liquid Chromatographic Analysis.

EXAMPLE II

To illustrate the unexpected activity and improved yields which are obtained by adding a nitrogen-containing compound to the reaction mixture another experiment was performed in which 61 g. of toluene was placed in the glass liner of a rotating autoclave along with 4 g. of cobalt bromide and 1 g. of benzonitrile. The autoclave was sealed and a sufficient amount of air pressed in until an initial operating pressure of 35 atmospheres was reached. The autoclave was again heated to 180°C. and maintained thereat for a period of 16 hours, the maximum pressure at this temperature being 62 atmospheres. As in the previous experiments heating was discontinued at the end of the 16 hour period and the autoclave allowed to return to room temperature, the final pressure at room temperature being 26 atmospheres. The excess pressure was discharged, the autoclave was opened and the reaction product mixture was recovered. After extraction with alkali, acidification and further extraction, there was recovered 15 g. (123 mmoles) of benzoic acid.

EXAMPLE III

To illustrate the necessity for the presence of both a metal-containing compound and a nitrogen-containing compound another experiment was performed in which 63 g. of toluene and 4 g. of benzonitrile were treated in an autoclave in a manner similar to that hereinbefore set forth, that is, the autoclave was sealed, pressurized with 35 atmospheres of air and heated to 180°C. for 16 hours. The maximum pressure during the 16 hour period rose to 53 atmospheres and dropped to 34 atmospheres upon cooling at the end of the residence time. Treatment of the reaction product mixture resulted in the obtention of 1.1 g. of benzoic acid.

It is therefore readily ascertainable from the above experiments that the presence of a nitrogen-containing compound in which the nitrogen is present in a doubly or triply bonded state as exemplified by benzonitrile along with a metal-containing catalyst such as cobalt bromide results in a substantial increase in the yield of benzoic acid over that which is obtained when either or both of these compositions of matter are absent from the reaction mixture.

EXAMPLE IV

This example also illustrates the efficacy of utilizing a nitrogen-containing compound to obtain an increased yield of a desired oxidation product. In this example 60 g. of toluene was charged to an autoclave along with 4 g. of cobalt bromide and 0.5 g. of aqueous ammonia. The autoclave was sealed and air pressed in to an initial operating pressure of 35 atmospheres. The autoclave was then heated to a temperature of 180°C. and maintained thereat for a period of 16 hours, the maximum pressure at this temperature rising to 68 atmospheres. After heating was discontinued and the autoclave was allowed to cool to room temperature, the final pressure reached 25 atmospheres. This pressure was discharged, the autoclave was opened and the reaction product mixture was recovered. After treatment of the product in a manner similar to that set forth above, there was recovered 13.4 g. (110 mmoles) of benzoic acid.

EXAMPLE V

In this example two runs were made, the first run treating 60 g. of toluene with 4 g. of cobalt neodecanoate. The conditions of this experiment were identical to those above, that is, an initial air pressure of 35 atmospheres, an operating temperature of 180°C. and a residence time of 16 hours. Upon completion of the experiment there was recovered 3.8 g. (31 mmoles) of benzoic acid.

The same experiment was repeated utilizing 4 g. of cobalt neodecanoate and 1.5 g. of aqueous ammonia. The reaction mixture, after undergoing a run at identical conditions to that set forth in the above experiment, produced 6.0 g. (49 mmoles) of benzoic acid.

EXAMPLE VI

A charge comprising 80 g. of o-xylene, 4 g. of cobalt bromide and 1 g. of benzonitrile is placed in the glass liner of a rotating autoclave. The autoclave is sealed and air is pressed in until an initial pressure of 35 atmospheres is reached. The autoclave is then heated to a temperature of 180°C. and maintained at this temperature for a period of about 16 hours, the maximum pressure reaching about 60 atmospheres during this time. At the end of this time heating is discontinued, the autoclave is allowed to return to room temperature and the excess pressure is discharged. The autoclave is opened, the reaction mixture is recovered in aqueous alkali and separated from the catalyst by means of filtration. After extraction to remove unreacted o-xylene and charging oxidized products followed by separation, acidification and extraction, the desired product comprising phthalic acid is recovered.

EXAMPLE VII

In this example 80 g. of m-xylene, 4 g. of cobalt oxide and 1 g. of a 30 percent aqueous ammonia solution are placed in the glass liner of a rotating autoclave. The liner is sealed into the autoclave and air pressed in until an initial operating pressure of 35 atmospheres is reached. The autoclave is then heated to a temperature of 180°C. and maintained thereat for a period of 16 hours following which heating is discontinued, the autoclave is allowed to return to room temperature and the excess pressure is discharged. The autoclave is opened, the reaction mixture is recovered and extracted, acidified and further extracted, the desired product comprising isophthalic acid being separated and recovered.

EXAMPLE VIII

A charge stock consisting of 80 g. of p-xylene, 4 g. of nickel bromide and 1 g. of acetonitrile is placed in the glass liner of a rotating autoclave which is thereafter sealed. Air is pressed in until an initial operating pressure of 35 atmospheres is reached and the autoclave is then heated to a temperature of 180°C. The autoclave is maintained at this temperature for a period of 16 hours, the maximum pressure at this temperature reaching approximately 60 atmospheres. At the end of the aforementioned residence time heating is discontinued and the autoclave is allowed to return to room temperature, the final pressure at room temperature being about 30 atmospheres. The excess pressure is discharged and the autoclave is opened, the reaction product is extracted with alkali, acidified and further extracted, the desired product comprising terephthalic acid being recovered therefrom.

I claim as my invention:

1. A process for the preparation of an aromatic acid which comprises treating an alkyl-aromatic hydrocarbon, at a temperature of about 100° to about 250°C. and a pressure of about 1 to about 100 atmospheres, with an oxygen-containing gas in the presence of (1) a metal-containing compound in which the metal is selected from the group consisting of cobalt, manganese, nickel and iron and (2) a nitrogen-containing compound selected from the group consisting of ammonia, compounds which will generate ammonia at the aforesaid temperature and pressure, amines selected from the group consisting of methylamine, ethylamine, dimethylamine and triethylamine, and hydrogen cyanide, and recovering the resulting aromatic acid.

2. The process as set forth in claim 1 in which said metal-containing compound is cobalt bromide.

3. The process as set forth in claim 1 in which said metal-containing compound is cobalt oxide.

4. The process as set forth in claim 1 in which said nitrogen-containing compound is ammonia.

5. The process as set forth in claim 1 in which said nitrogen-containing compound is benzonitrile.

6. The process as set forth in claim 1 in which said alkylaromatic is toluene and said aromatic acid is benzoic acid.

7. The process as set forth in claim 1 in which said alkylaromatic is o-xylene and said aromatic acid is phthalic acid.

8. The process as set forth in claim 1 in which said alkylaromatic is m-xylene and said aromatic acid is isophthalic acid.

9. The process as set forth in claim 1 in which said alkylaromatic is p-xylene and said aromatic acid is terephthalic acid.

* * * * *